United States Patent
Hewitt et al.

(10) Patent No.: US 12,159,108 B2
(45) Date of Patent: Dec. 3, 2024

(54) INFORMATION SHARING WITH EFFECTIVE ATTENTION MANAGEMENT SYSTEM

(71) Applicant: INTERNATIONAL BUSINESS MACHINES CORPORATION, Armonk, NY (US)

(72) Inventors: Trudy L. Hewitt, Cary, NC (US); Christian Compton, Austin, TX (US); Jeremy R. Fox, Georgetown, TX (US); Fang Lu, Billerica, MA (US); Uri Kartoun, Cambridge, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 301 days.

(21) Appl. No.: 17/807,919

(22) Filed: Jun. 21, 2022

(65) Prior Publication Data

US 2023/0409831 A1 Dec. 21, 2023

(51) Int. Cl.
*G06F 40/279* (2020.01)
*G06F 40/166* (2020.01)
*G06F 40/30* (2020.01)
*G06Q 50/00* (2012.01)

(52) U.S. Cl.
CPC .......... *G06F 40/279* (2020.01); *G06F 40/166* (2020.01); *G06F 40/30* (2020.01); *G06Q 50/01* (2013.01)

(58) Field of Classification Search
CPC ...... G06F 40/279; G06F 40/166; G06F 40/30; G06Q 50/01
See application file for complete search history.

(56) References Cited

U.S. PATENT DOCUMENTS

| | | | |
|---|---|---|---|
| 8,676,875 B1 * | 3/2014 | Smith | G06Q 30/0256 709/200 |
| 8,938,450 B2 | 1/2015 | Spivack | |
| 8,949,377 B2 | 2/2015 | Makar | |
| 10,074,102 B2 | 9/2018 | N | |
| 2010/0004975 A1 * | 1/2010 | White | G06Q 30/0201 705/7.29 |

(Continued)

OTHER PUBLICATIONS

Brownlee, "What are Word Embeddings for Text?," Machine Learning Mastery [online], Oct. 11, 2017 [accessed on Apr. 28, 2022], 27 pages, Retrieved from the Internet: <URL: https://machinelearningmastery.com/what-are-word-embeddings/>.

(Continued)

*Primary Examiner* — Abul K Azad
(74) *Attorney, Agent, or Firm* — Elliot J. Shine

(57) ABSTRACT

A method, computer system, and a computer program product for optimizing social collaboration is provided. The present invention may include identifying content within a social collaboration history with a high level of engagement. The present invention may include generating one or more groups of unique topic keywords based on the identified content. The present invention may include receiving a potential post from a user. The present invention may include identifying an overlap between the potential post and at least one of the one or more groups of unique topic keywords. The present invention may include providing one or more recommendations to the user.

20 Claims, 5 Drawing Sheets

(56) References Cited

U.S. PATENT DOCUMENTS

| | | | | |
|---|---|---|---|---|
| 2015/0127591 A1* | 5/2015 | Gupta | ................... | G06Q 50/01 |
| | | | | 706/12 |
| 2017/0308583 A1* | 10/2017 | Husain | ................ | G06F 16/9024 |
| 2019/0042557 A1 | 2/2019 | Okubo | | |
| 2021/0173886 A1* | 6/2021 | Dunne | .................. | G06F 40/186 |

OTHER PUBLICATIONS

Google Ads Help, "Basic tips for building a keyword list," google.com [online], [accessed on May 11, 2022], 2 pages, Retrieved from the Internet: <URL: https://support.google.com/google-ads/answer/2453981?hl=en>.

Mell, et al., "The NIST Definition of Cloud Computing", National Institute of Standards and Technology, Special Publication 800-145, Sep. 2011, 7 pages.

Yao, et al., "Detecting High-Quality Posts in Community Question Answering Sites," Information Sciences [article], 2015, pp. 70-82, vol. 302, Retrieved from the Internet: <URL: https://www.sciencedirect.com/science/article/abs/pii/S002002551401189X?via%3Dihub>.

* cited by examiner

INFORMATION SHARING WITH EFFECTIVE ATTENTION MANAGEMENT SYSTEM

BACKGROUND

The present invention relates generally to the field of computing, and more particularly to Natural Language Processing.

There may be situations on social networking websites and/or workplace messaging platforms in which a user opens up the platform to enable receipt of questions. Within an organization, senior management may open up questioning to employees with respect various topics related to the organization. Often times a user may receive far more questions than the user may be able to individually answer which may lead to frustration amongst users whose questions may not have been directly answered.

Often times it may simply be the terminology and/or phraseology a user utilizes in wording their post and/or question which may account for the lack of engagement.

SUMMARY

Embodiments of the present invention disclose a method, computer system, and a computer program product for attention management. The present invention may include identifying content within a social collaboration history with a high level of engagement. The present invention may include generating one or more groups of unique topic keywords based on the identified content. The present invention may include receiving a potential post from a user. The present invention may include identifying an overlap between the potential post and at least one of the one or more groups of unique topic keywords. The present invention may include providing one or more recommendations to the user.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
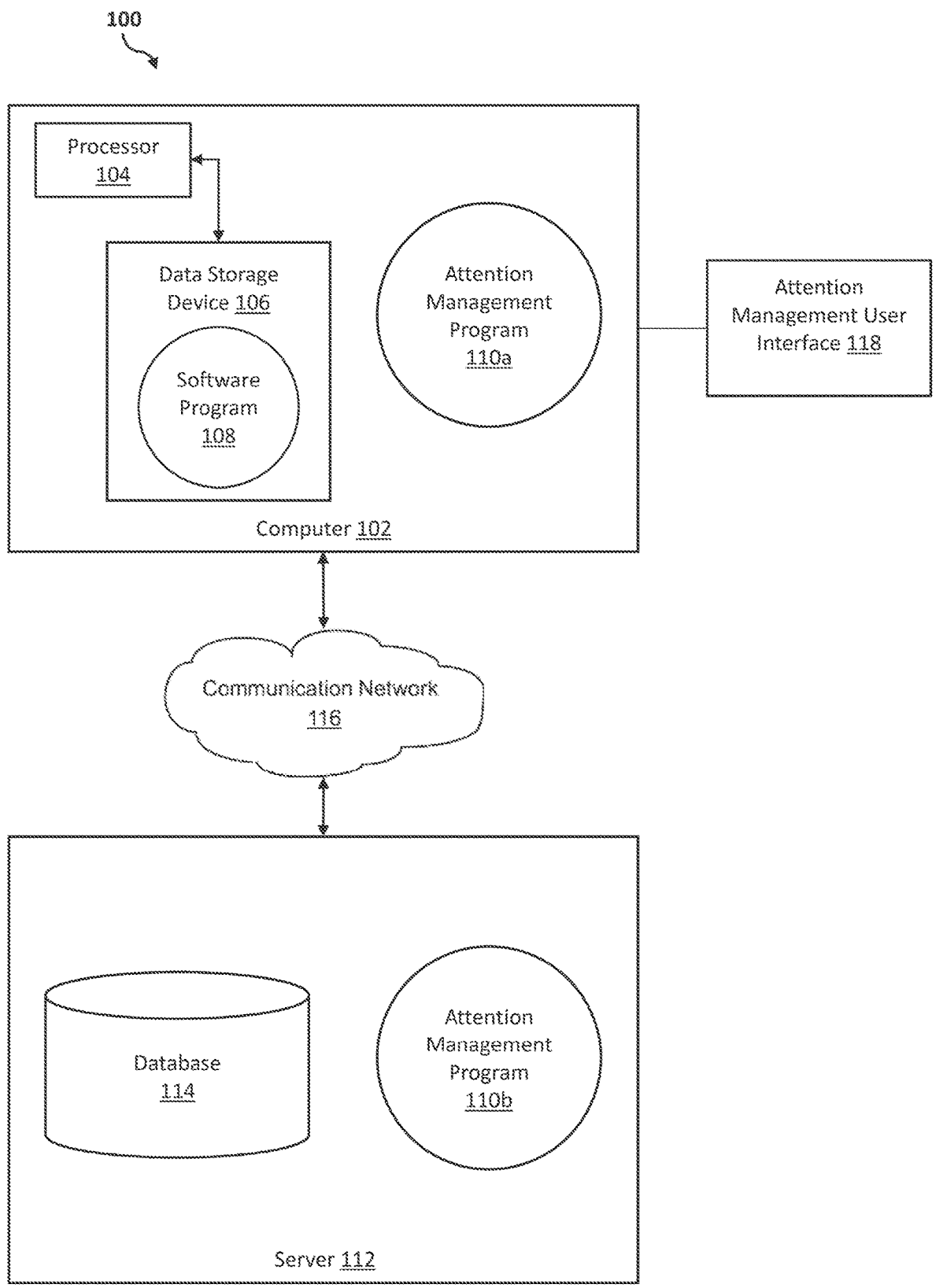
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for attention management. As such, the present embodiment has the capacity to improve the technical field of Natural Language Processing (NPL) by improving social collaboration by rephrasing potential posts of a user to include identified keywords. More specifically, the present invention may include identifying content within a social collaboration history with a high level of engagement. The present invention may include generating one or more groups of unique topic keywords based on the identified content. The present invention may include receiving a potential post from a user. The present invention may include identifying an overlap between the potential post and at least one of the one or more groups of unique topic keywords. The present invention may include providing one or more recommendations to the user.

As described previously, there may be situations on social networking websites and/or workplace messaging platforms in which a user opens up the platform to enable receipt of questions. Within an organization senior management may open up questioning to employees with respect various topics related to the organization. Often times a user may receive far more questions than the user may be able to individually answer which may lead to frustration amongst users whose questions may not have been directly answered.

Often times it may simply be the terminology and/or phraseology a user utilizes in wording their post and/or question which may account for the lack of engagement.

Therefore, it may be advantageous to, among other things, identify content within a social collaboration history with a high level of engagement, generate one or more groups of unique topic keywords based on the identified content, receive a potential post from a user, identify an overlap between the potential post and at least one of the one or more groups of unique topic keywords, provide one or more recommendations to the user.

According to at least one embodiment, the present invention may improve social collaboration by increasing the likelihood a user receives feedback by rephrasing potential posts of a user to include one or more identified keywords corresponding to a topic of the potential post.

According to at least one embodiment, the present invention may improve social collaboration by retrieving similar content to a user's potential post as well as feedback and/or engagement corresponding to the similar content which may enable a user to evaluate at least whether the user's potential post may have already been answered and/or the sentiment of the feedback and/or engagement with the similar content.

According to at least one embodiment, the present invention may improve record keeping for social collaborations by storing the social collaboration history in a knowledge corpus (e.g., a database such as database 114 introduced with respect to FIG. 1 below) which may be utilized in retrieving previous content based on topics, keywords, and/or timestamps.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an attention management program 110*a*. The networked computer environment 100 may also include a server 112 that is enabled to run an attention management program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the attention management program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the attention management program 110a, 110b (respectively) to improve social collaboration by rephrasing potential posts of a user to include identified keywords. The attention management method is explained in more detail below with respect to FIG. 2.

Figure 2:
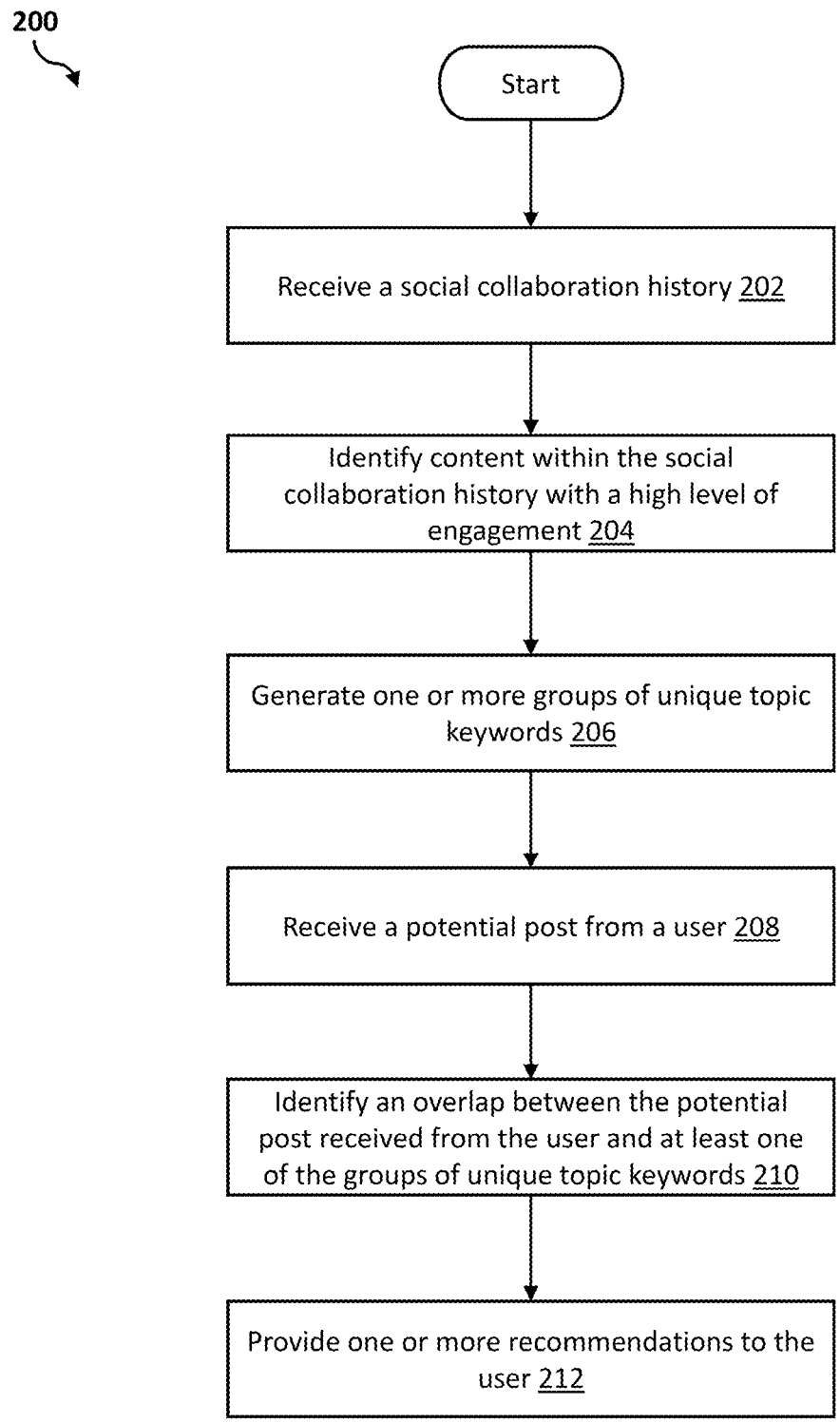
FIG. 2 is an operational flowchart illustrating a process for attention management according to at least one embodiment.

Referring now to FIG. 2, an operational flowchart illustrating the exemplary attention management process 200 used by the attention management program 110a and 110b (hereinafter attention management program 110) according to at least one embodiment is depicted.

At 202, the attention management program 110 receives a social collaboration history. The social collaboration history may be for an online forum, social media feed, and/or other online platform in which users may engage with one another. The attention management program 110 may store the social collaboration history in a knowledge corpus (e.g., database 114). As will be explained in more detail below, the attention management program 110 may store the social collaboration history based on at least engagement, subject matter, time stamps, tags, titles, keywords, amongst other details which may be identified and/or extracted from the metadata associated with the social collaboration history.

The attention management program 110 may receive and/or request permission from a user, organization, and/or online platform prior to receiving the social collaboration history. The social collaboration history may include, but is not limited to including, textual content, audio content, visual content, amongst other content which may be disseminated on an online platform, such as, but not limited to meeting transcripts, invite records, attendance records, length of meetings, meeting subjects and/or descriptions, chat discussions, questions proposed by users, questions selected by and/or responded to, amongst other social collaboration history data for the online forum, social media feed, and/or other online platforms.

The attention management program 110 may analyze the social collaboration history utilizing one or more linguistic analysis techniques. The one or more linguistic analysis techniques may include, but are not limited to including, a machine learning model with Natural Language Processing (NLP), Latent Dirichlet Allocation (LDA), speech-to-text, Hidden markov models (HMM), N-grams, Speaker Diarization (SD), Semantic Textual Similarity (STS), Keyword Extraction, amongst other analysis techniques, such as those implemented in IBM Watson® (IBM Watson and all Watson-based trademarks are trademarks or registered trademarks of International Business Machines Corporation in the United States, and/or other count IBM Watson® Speech to Text, IBM Watson® Tone Analyzer, IBM Watson® Natural Language Understanding, IBM Watson® Natural Language Classifier, amongst other implementations.

For example, the attention management program 110 may receive social collaboration history for a monthly office hours conducted by the senior management of an organization. Users may propose a plurality of questions to the senior management and the senior management may select and answer one or more of the plurality of questions proposed by the users. In this example, the attention management program 110 may store the plurality of questions proposed by the users as well as the one or more questions which were selected by the senior management for the monthly office hours. The attention management program 110 may utilize the one or more linguistic analysis techniques described above in analyzing the social collaboration history for the monthly office hours as well as additional information made available by a user to classify at least the questions, responses, and/or topics in the knowledge corpus (e.g., database 114).

At 204, the attention management program 110 may identify content within the social collaboration history with a high level of engagement. The attention management program 110 may identify content within the social collaboration history with the highest level of engagement by performing a classification analysis and/or ranking content within the social collaboration history. The attention management program 110 may perform the classification analysis and/or ranking of the content for each of a plurality of topics stored in the knowledge corpus (e.g., database 114).

The attention management program 110 may perform a classification analysis on the content within the social collaboration history utilizing one or more classification models. The one or more classification models may include but are not limited to including a binary classification model. The binary classification model may utilize one or more algorithms, including, but not limited to, logistic regression, k-nearest neighbor, decision trees, support vector machines, naïve bayes, amongst others. The binary classification model may be utilized by the attention management program 110 in classifying content as either "answered" or "unanswered" content.

Continuing with the example above in which the users proposed a plurality of questions to the senior management, the attention management program 110 may utilize the binary classification model in classifying the plurality of questions as either "answered" or "unanswered" whereby the one or more questions selected by the senior management may be classified as "answered" while the remaining questions may be classified as "unanswered." In this example, the attention management program 110 may additionally utilize the one or more linguistic analysis techniques described above in analyzing and/or ranking the content classified as "answered." For example, senior management may select and answer 15 questions in the monthly office hours. Of the 15 questions, 5 questions may be related to Topic 1, 5 Questions may be related to Topic 2, and 5 Questions may be related to Topic 3. For each of the 15 questions answered, the attention management program 110 may utilize the one or more linguistic analysis techniques in performing at least a sentiment analysis of the audio/visual response, which may include analysis of the audio to detect at least, volume, tone, and/or inflection, as well as video to detect gestures, emotions, and/or other body language. Additionally, the attention management program 110 may utilize tools such as, but not limited to, IBM Watson® Speech to Text (IBM Watson® and all Watson-based trademarks are trademarks or registered trademarks of International Business Machines Corporation in the United States, and/or other countries) in create a transcript of the response for each of the 15 questions. The sentiment analysis f the transcript may include polarity classification, sentiment classification according to a pre-defined set of emotional states, subjectivity/objectivity identification, and/or feature/aspect-based sentiment analysis. The sentiment analysis of the textual content may be determined based on words, punctuation, tone, amongst other components of the text associated with the transcript.

The attention management program 110 may rank individual content within the social collaboration history for each topic and/or core theme based on engagement, wherein engagement may include, but is not limited to including, likes, replies, shares, and/or other foie s of engagement. The attention management program 110 may weight the rank of the individual content within each topic based on at least recency of the individual content and/or engagement, time length of response and/or discussion, engagement compared to similar content, amongst other factors. The attention management program 110 may utilize time stamps derived from the metadata of the social collaboration and/or other information made available by the user in determining the recency and/or the time length of the response and/or discussion. Additionally, the attention management program 110 may evaluate engagement based on at least, likes, replies, shares, amongst other forms of engagement.

At 206, the attention management program 110 generates one or more groups of unique topic keywords. The attention management program 110 may generate the groups of unique topic keywords by identifying one or more keywords appearing in the content with a high ranking based on the ranking of individual content at step 204. As will be explained in more detail below, the attention management program 110 may utilize the one or more linguistic analysis techniques described above amongst other keyword analysis tools in identifying the keywords of a repeating nature and/or above a cumulative word count within the content with a high ranking for each topic.

The attention management program 110 may analyze a semantic meaning for each of the one or more keywords appearing in the content with the highest level of engagement. The attention management program 110 may utilize the semantic meaning for each of the one or more keywords appearing in the content to derive a semantic extrapolation based on usage frequency and/or similar word expansion. The attention management program 110 may also utilize one or more word embedding algorithms in identifying relevant similar keywords (e.g., similar words) to the one or more keywords identified in the content. More specifically, the attention management program 110 may utilize the linguistic analysis techniques described above including the machine learning model with NLP. NLP may include, but is not limited to including, GloVe, tokenization, stemming, Mel-frequency cepstrum (MFC), lemmatization, N-Grams, TF-IDF, and word embedding. Word embedding may include a set of language modeling feature learning techniques within NLP wherein words or phrases may be mapped to vectors of real numbers. Word vectors may be vectors of numbers that represent the meaning of a word. The attention management program 110 may convert the word vectors to a numerical format and utilize NLP with at least cosine similarity in identifying the similar words to the one or more keywords identified. The attention management program 110 may utilize a cosine similarity value as a threshold value for similar words.

The attention management program 110 may store the one or more keywords appearing in the content with the highest level of engagement and/or the one or more similar words in the knowledge corpus (e.g., database 114). The attention management program 110 may store the one or more keywords and/or the one or more similar words according to topics, such that each topic for which the social collaboration history may be analyzed may include a unique group of topic keywords. The attention management program 110 may rank the one or more keywords and the one or more similar words within each of the unique group of topic keywords. The attention management program 110 may rank the one or more keywords and the one or more similar words according to a cumulative word count and/or a corresponding ranking of the content in which the keywords and/or similar words may be derived. Additionally, the cumulative word count may be weighted such that the one or more keywords and/or the one or more similar words more recently derived may be ranked higher than the one or more keywords and/or the one or more similar words less recently derived. The attention management program 110 may update the rankings for each of the unique group of topic keywords based on a periodic (e.g., hourly, daily, weekly, monthly) result and/or a defined variable time length.

At 208, the attention management program 110 receives a potential post from a user. The potential post from the user may be a question, response, and/or other content. The attention management program 110 may receive the potential post from the user in an attention management user interface 118. The attention management user interface 118 may be displayed by the attention management program 110 in at least an internet browser, dedicated software application, and/or as an integration with a third party software application.

The attention management program 110 may analyze (e.g., by deconstructing the potential post to determine a topic of the potential post, identifying one or more potential keywords included in the potential post, identifying a potential target audience, among other things) the potential post from the user and/or additional information provided by the user in determining a topic. The attention management program 110 may analyze the potential post from the user utilizing at least the linguistic analysis techniques described above in determining the topic. The user may also identify the topic and/or social collaboration manually within the attention management user interface 118. The attention management program 110 may perform a topical analysis utilizing the machine learning model with NLP in mapping one or more potential keywords and/or phrases within the potential post received from the user to word vectors of real numbers.

In an embodiment, the attention management program 110 may additionally analyze a potential target audience of the potential post. In this embodiment, the user may select a potential target audience within the attention management user interface 118 and/or the attention management program 110 may derive the potential target audience from the content of the potential post. For example, continuing with the office hours example from step 204, the user may identify one or more members of senior management for which the potential post may be directed in the attention management user interface 118. In this example, the attention management program 110 may filter the social collaboration history and/or re-rank the individual content within the social collaboration history to identify one or more keywords within the at least one group of unique topic keywords generated from a re-ranking of the individual content based on the potential target audience. As will be explained in more detail with respect to at least step 212 this may impact the one or more recommendations to the user such that the one or more recommendations may be specific to the potential target audience, in this example, the senior management team. In another example, the attention management program 110 may derive the potential target audience from the content of the potential post and/or the online forum, social media feed, and/or other online platform in which the user may intend to publish the potential post. In this example, the attention management program 110 may analyze subscribers, followers, and/or other potential target audiences which the user may reach with the potential post. The attention management program 110 may filter the social collaboration history and/or re-rank the individual content within the social collaboration history to identify one or more keywords within the at least one group of unique topic keywords generated from the re-ranking of the individual content, which may impact the one or more recommendation to the user such that the one or more recommendations may be more specific to the potential target audience identified.

At 210, the attention management program 110 identifies an overlap between the potential post received from the user and at least one of the groups of unique topic keywords stored in the knowledge corpus (e.g., database 114). The attention management program 110 may identify an overlap between the potential post received from the user and at least one of the groups of unique topic keywords based on a comparison of the topic of the potential post and the topics of the groups of unique topic keywords stored in the knowledge corpus (e.g., database 114). Additionally, the attention management program 110 may leverage the one or more potential keywords in the user's post in identifying the overlap between the one or more keywords appearing in the content with the highest level of engagement and/or the one or more similar words stored in the knowledge corpus (e.g., database 114) for the at least one of the groups of unique topic keywords identified based on the comparison of the topic of the potential post the topics of the groups of unique topic keywords.

The attention management program 110 may utilize the topic identified for the potential post received from the user in identifying one or more groups of unique topic keywords stored in the knowledge corpus (e.g., database 114). The attention management program 110 may utilize the one or more linguistic analysis techniques and/or the machine learning model with NLP in performing a topical analysis and/or matching between the potential post received from the user and the one or more groups of unique topic keywords and/or metadata associated with the social collaboration history stored in the knowledge corpus (e.g., database 114). The attention management program 110 may additionally utilize the word vectors derived from the words or phrases of the potential post in comparing those word vectors with the word vectors of the one or more keywords and/or similar words within the one or more groups of unique topic keywords stored in the knowledge corpus (e.g., database 114).

At 212, the attention management program 110 provides one or more recommendations to the user. The attention management program 110 may provide the one or more recommendations to the user in the attention management user interface 118.

The one or more recommendations may include, but are not limited to including, rephrasing of the potential post from the user to include one or more keywords and/or similar words from at least one of the groups of unique topic keywords stored in the knowledge corpus (e.g., database 114) identified at step 210, providing the user a list of alternative terms derived from the groups of unique topic keywords based on the topic determined for the potential post based on the alternative terms having a similar meaning more likely to increase engagement with the potential post, recommending the user include data and/or metadata with their post, amongst other recommendations. The attention management program 110 may temporarily replace one or more words and/or phrases within the user's potential post with the one or more keywords and/or similar words identified from the at least one unique group of topic keywords and ensure the grammar may be accurate prior to providing the recommendation to the user in the attention management user interface 118. The one or more recommendations provided by the attention management program 110 may be utilized to increase engagement with the user's post both qualitatively and/or quantitatively.

The attention management program 110 may additionally leverage predictive data analytics in increasing a likelihood of engagement for the user's potential post. The predictive data analytics may include, but is not limited to including, historical engagement, previous success rates, and/or failure rates for previous posts stored in the knowledge corpus (e.g., database 114) for the social collaboration history. The attention management program 110 may quantify the predictive data analytics for previous social collaboration histories of similar topics and present the predictive data analytics to the user in the attention management user interface 118. The attention management program 110 may display a predicted engagement for at least the potential post received from the user and/or one or more rephrasing's of the potential post recommended by the attention management program 110. As will be explained in more detail below, the attention management program 110 may monitor how a post from the user performs which may be utilized by the attention management program 110 in predicting a performance of future posts of the user.

In an embodiment, the attention management program 110 may retrieve one or more pieces of content from the knowledge corpus (e.g., database 114) based on a similarity analysis between the potential post and the social collaboration history utilizing the one or more linguistic analysis tools described at step 202. In this embodiment, the attention management program 110 may retrieve similar content to the user's potential post as well as feedback and/or engagement corresponding to the similar content. The attention management program 110 may display audio, visual, and/or text for the one or more pieces of retrieved content. The attention management program 110 may provide the one or more pieces of content to the user within the attention management user interface 118 which may enable the user to evaluate whether their potential post may have already been answered, the sentiment of responses to similar posts, amongst other information which may be derived from the one or more pieces of content. In this embodiment, the attention management program 110 may provide a warning to the user based on at least a sentiment analysis of responses to the one or more pieces of content similar to the potential post. The attention management program 110 may utilize, unique colors, flags, and/or other visual representation to warn the user prior to transmitting the potential post and/or a rephrasing of the potential post.

The attention management program 110 may monitor how a post from the user performs with respect to feedback, which may include, but is not limited to including engagement and/or responses and the sentiment of the engagement and/or responses. The attention management program 110 may utilize the feedback monitored for the post of the user in at least re-ranking the keywords and/or similar words for the corresponding unique group of topic keywords for which the rephrasing of the potential post may be derived. The attention management program 110 may store data related to the performance of the post from the user in the knowledge corpus (e.g., database 114). The attention management program 110 may utilize the data stored in the knowledge corpus (e.g., database 114) in predicting the performance of future posts of the user and improving the one or more recommendations to the user. The attention management program 110 may also monitor which users engaged with the post from the user and may utilize at least this data in identifying the potential target audience of future posts of the user.

It may be appreciated that FIG. 2 provides only an illustration of one embodiment and do not imply any limitations with regard to how different embodiments may be implemented. Many modifications to the depicted embodiment(s) may be made based on design and implementation requirements.

Figure 3:
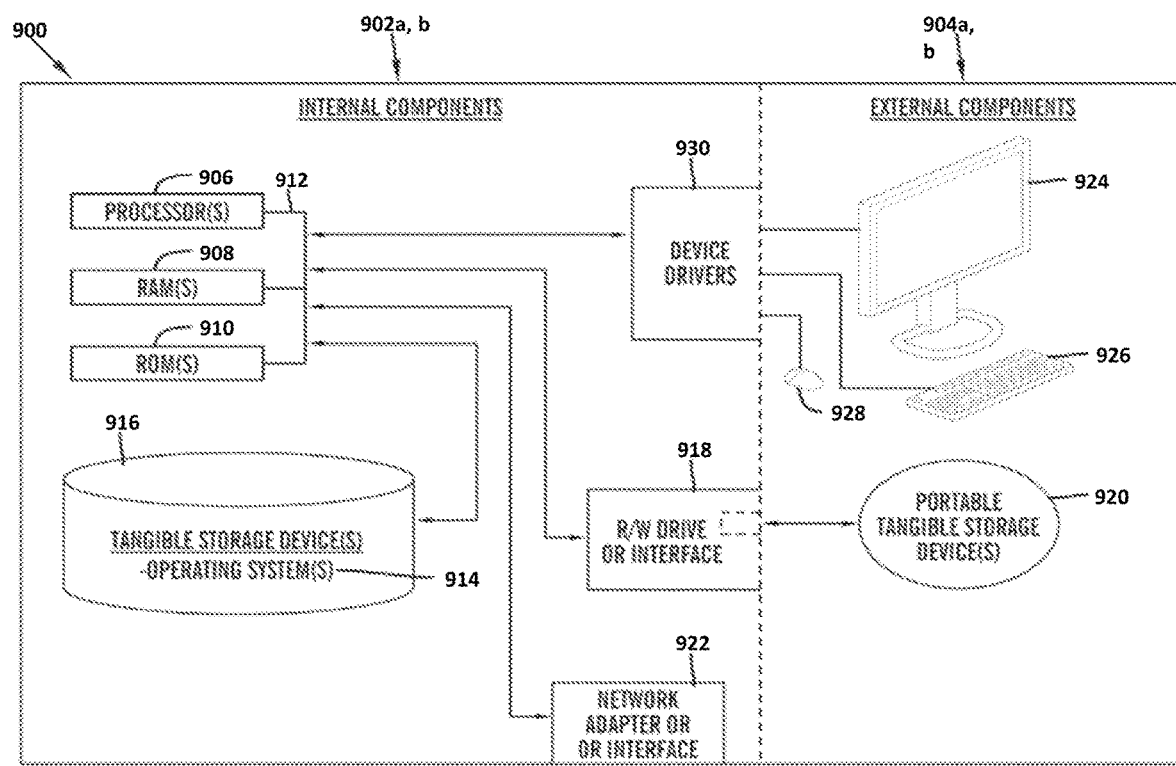
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b, and external components 904a, b illustrated in FIG. 3. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the attention management program 110a in client computer 102, and the attention management program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk, or semiconductor storage device. A software program, such as the software program 108 and the attention management program 110a and 110b can be stored on one or more of the respective portable computer-readable tangible storage devices 920, read via the respective RAY drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the attention management program 110a in client computer 102 and the attention management program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the attention management program 110a in client computer 102 and the attention management program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
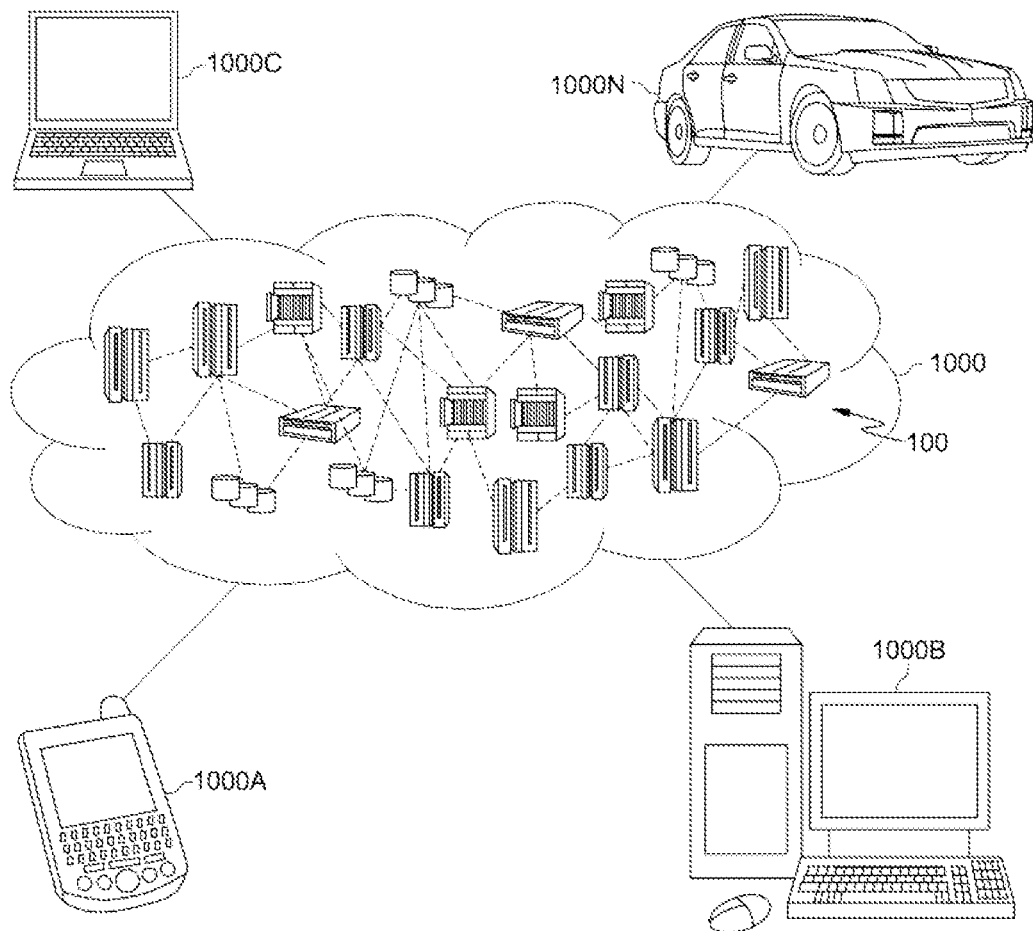
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
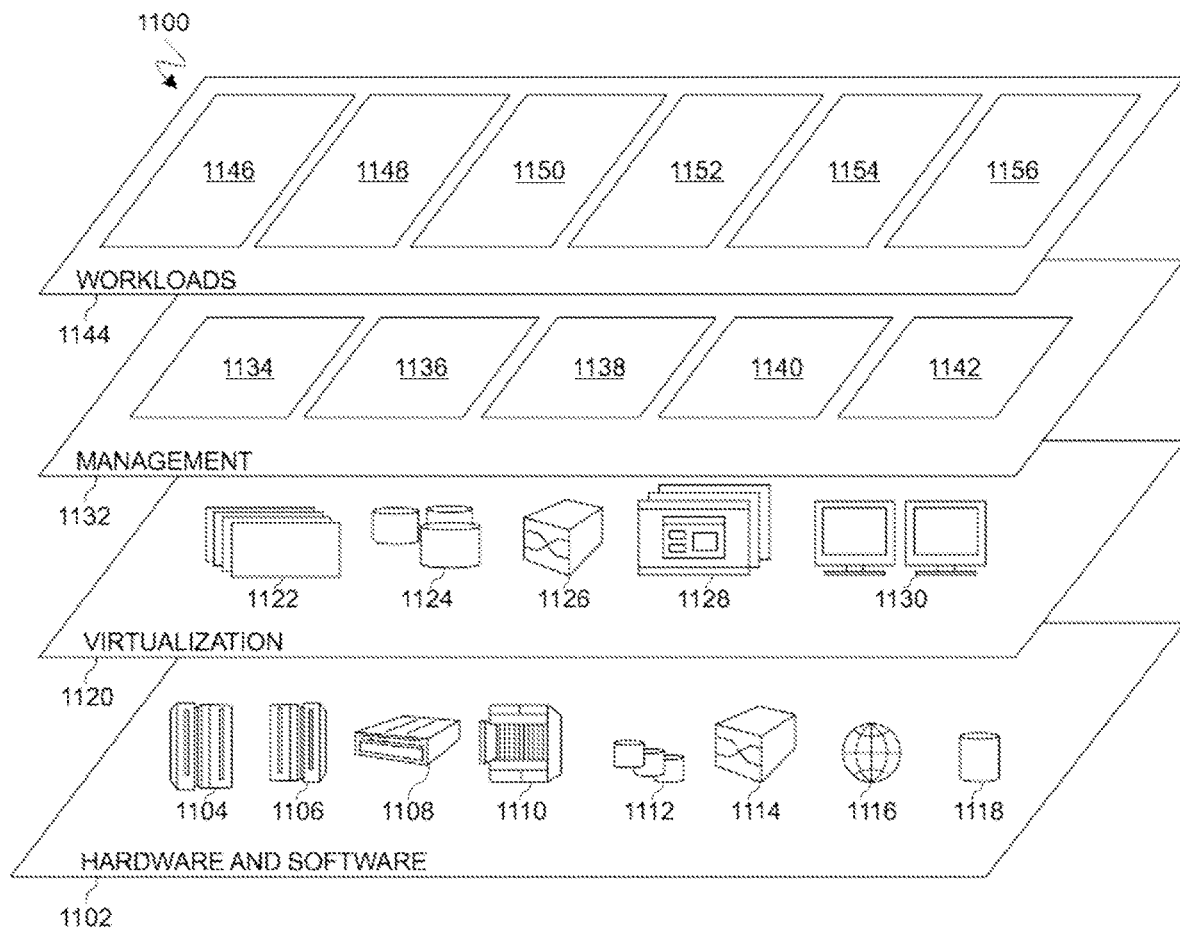
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and the attention management program 1156. An attention management program 110a, 110b provides a way to improve social collaboration by rephrasing potential posts of a user to include identified keywords.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

The present disclosure shall not be construed as to violate or encourage the violation of any local, state, federal, or international law with respect to privacy protection.

What is claimed is:

1. A method for optimizing social collaboration, the method comprising:
    identifying content within a social collaboration history with a high level of engagement;
    generating one or more groups of unique topic keywords based on the identified content;
    receiving a potential post from a user in an attention management user interface;
    identifying an overlap between the potential post and at least one of the one or more groups of unique topic keywords;
    rephrasing the potential post received from the user to include one or more keywords or similar words from the one or more groups of unique topic keywords; and
    presenting predictive data analytics to the user in the attention management user interface, wherein the predictive data analytics include at least a predicted engagement for the potential post received from the user and a rephrasing of the potential post.

2. The method of claim 1, wherein generating the one or more groups of unique topic keywords further comprises:
    ranking the content within the social collaboration history according to topic;
    identifying one or more keywords within the content; and
    deriving one or more similar words from the one or more keywords utilizing one or more linguistic analysis techniques.

3. The method of claim 1, wherein the one or more groups of unique topic keywords are stored in a knowledge corpus.

4. The method of claim 1, further comprising:
    retrieving one or more pieces of content from a knowledge corpus based on a similarity analysis between the potential post and the social collaboration history; and
    displaying the one or more pieces of content retrieved from the knowledge corpus to the user in an attention management user interface.

5. The method of claim 4, wherein the one or more pieces of content displayed to the user in the attention management user interface may include a visual representation warning within the attention management user interface based on a sentiment analysis of responses to the one or more pieces of content.

6. The method of claim 5, wherein the one or more pieces of retrieved content include at least audio, visual, or textual content associated with each of the one or more pieces of content retrieved and an engagement with each of the one or more pieces of content retrieved.

7. The method of claim 6, wherein performing the sentiment analysis further comprises:
    analyzing at least the audio or the visual content associated with the one or more pieces of content retrieved, wherein at least one or more of a volume, a tone, or an inflection are analyzed for the audio, and wherein at least one or more of gestures, emotions, or body language are analyzed for the video content.

8. The method of claim 1, further comprising:
    monitoring a performance of a post of the user, wherein data related to the performance of the post is stored in a knowledge corpus; and
    re-ranking the one or more keywords or the similar words from the one or more groups of unique topic keywords based on the performance of the post of the user.

9. The method of claim 1, wherein identifying an overlap between the potential post and at least one of the one or more groups of unique topic keywords further comprises:
    performing a topic analysis between the potential post and the one or more groups of unique keywords using a machine learning model with Natural Language Processing (NLP) to compare word vectors derived from the potential post with word vectors of the one or more keywords or similar words from the one or more groups of unique topic keywords.

10. The method of claim 1, wherein the rephrasing of the potential post is based on an analysis of a potential target audience of the potential post.

11. A computer system for optimizing social collaboration, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
identifying content within a social collaboration history with a high level of engagement;
generating one or more groups of unique topic keywords based on the identified content;
receiving a potential post from a user in an attention management user interface;
identifying an overlap between the potential post and at least one of the one or more groups of unique topic keywords;
rephrasing the potential post received from the user to include one or more keywords or similar words from the one or more groups of unique topic keywords; and
presenting predictive data analytics to the user in the attention management user interface, wherein the predictive data analytics include at least a predicted engagement for the potential post received from the user and a rephrasing of the potential post.

12. The computer system of claim 11, wherein generating the one or more groups of unique topic keywords further comprises:
ranking the content within the social collaboration history according to topic;
identifying one or more keywords within the content;
deriving one or more similar words from the one or more keywords utilizing one or more linguistic analysis techniques.

13. The computer system of claim 11, wherein the one or more groups of unique topic keywords are stored in a knowledge corpus.

14. The computer system of claim 11, further comprising:
retrieving one or more pieces of content from a knowledge corpus based on a similarity analysis between the potential post and the social collaboration history; and
displaying the one or more pieces of content retrieved from the knowledge corpus to the user in an attention management user interface.

15. The computer system of claim 14, wherein the one or more pieces of content displayed to the user in the attention management user interface may include a visual representation warning within the attention management user interface based on a sentiment analysis of responses to the one or more pieces of content.

16. A computer program product for optimizing social collaboration, comprising:
one or more non-transitory computer-readable storage media and program instructions stored on at least one of the one or more tangible storage media, the program instructions executable by a processor to cause the processor to perform a method comprising:
identifying content within a social collaboration history with a high level of engagement;
generating one or more groups of unique topic keywords based on the identified content;
receiving a potential post from a user in an attention management user interface;
identifying an overlap between the potential post and at least one of the one or more groups of unique topic keywords;
rephrasing the potential post received from the user to include one or more keywords or similar words from the one or more groups of unique topic keywords; and
presenting predictive data analytics to the user in the attention management user interface, wherein the predictive data analytics include at least a predicted engagement for the potential post received from the user and a rephrasing of the potential post.

17. The computer program product of claim 16, wherein generating the one or more groups of unique topic keywords further comprises:
ranking the content within the social collaboration history according to topic;
identifying one or more keywords within the content;
deriving one or more similar words from the one or more keywords utilizing one or more linguistic analysis techniques.

18. The computer program product of claim 16, wherein the one or more groups of unique topic keywords are stored in a knowledge corpus.

19. The computer program product of claim 16, further comprising:
retrieving one or more pieces of content from a knowledge corpus based on a similarity analysis between the potential post and the social collaboration history; and
displaying the one or more pieces of content retrieved from the knowledge corpus to the user in an attention management user interface.

20. The computer program product of claim 19, wherein the one or more pieces of content displayed to the user in the attention management user interface may include a visual representation warning within the attention management user interface based on a sentiment analysis of responses to the one or more pieces of content.

* * * * *